United States Patent [19]

Schirmer

[11] 4,006,589

[45] Feb. 8, 1977

[54] LOW EMISSION COMBUSTOR WITH FUEL FLOW CONTROLLED PRIMARY AIR FLOW AND CIRCUMFERENTIALLY DIRECTED SECONDARY AIR FLOWS

[75] Inventor: Robert M. Schirmer, Bartlesville, Okla.

[73] Assignee: Phillips Petroleum Company, Bartlesville, Okla.

[22] Filed: Apr. 14, 1975

[21] Appl. No.: 567,920

[52] U.S. Cl. .............................. 60/39.02; 60/39.23; 60/39.65; 60/DIG. 11

[51] Int. Cl.² ........................ F02G 3/00; F02C 3/00

[58] Field of Search .... 60/39.65, DIG. 11, 39.74 R, 60/39.74 B, 39.23, 39.02

[56] References Cited

UNITED STATES PATENTS

| | | | |
|---|---|---|---|
| 2,446,059 | 7/1948 | Peterson et al. | 60/39.65 |
| 2,579,614 | 12/1951 | Ray | 60/39.65 |
| 2,616,794 | 11/1952 | Krejci | 423/456 |
| 2,638,745 | 5/1953 | Nathan | 60/39.65 |
| 2,655,787 | 10/1953 | Brown | 60/39.23 |
| 2,659,201 | 11/1953 | Krejci | 60/39.65 |
| 2,773,350 | 12/1956 | Barrett et al. | 60/39.72 R |
| 2,828,609 | 4/1958 | Ogilvie | 60/39.74 R |
| 3,283,502 | 11/1966 | Lefebure | 60/39.65 |
| 3,306,333 | 2/1967 | Mock | 60/39.74 R |
| 3,490,230 | 1/1970 | Pillsbury et al. | 60/39.65 |
| 3,691,762 | 9/1972 | Ryberg et al. | 60/39.74 R |
| 3,763,650 | 10/1973 | Hussey et al. | 60/39.74 B |

*Primary Examiner*—Carlton R. Croyle
*Assistant Examiner*—Thomas I. Ross

[57] ABSTRACT

New combustors, and methods of operating same, which produce lower emissions, particularly lower emissions of nitrogen oxides and CO, are provided. Said combustors are provided with a first combustion region and an adjacent downstream second combustion region. A first stream of air is introduced, either radially, axially, or tangentially, into said first combustion region and the amount of said air is varied in accordance with fuel flow to said first combustion region. A second stream of air is introduced tangentially into said first combustion region. A third stream of air is introduced tangentially into said second combustion region. In preferred embodiments of the invention the air stream pressure drop across an air assist fuel nozzle is varied in accordance with fuel flow to said nozzle.

31 Claims, 18 Drawing Figures

LOW EMISSION COMBUSTOR WITH FUEL FLOW CONTROLLED PRIMARY AIR FLOW AND CIRCUMFERENTIALLY DIRECTED SECONDARY AIR FLOWS

This invention relates to new combustors and methods of operating same.

Air pollution has become a major problem in the United States and other highly industrialized countries of the world. Consequently, the control and/or reduction of said pollution has become the object of major research and development effort by both governmental and nongovernmental agencies. Combustion of fossil fuel is a primary source of said pollution. It has been alleged, and there is supporting evidence, that the automobiles employing conventional piston-type engines burning hydrocarbon fuels are a major contributor to said pollution. Vehicle emission standards have been set by the United States Environmental Protection Agency (EPA) which are sufficiently restrictive to cause automobile manufacturers to consider employing alternate engines instead of the conventional piston engine.

The gas turbine engine is being given serious consideration as an alternate engine. CO emissions in conventional prior art gas turbine processes operated for maximum fuel combustion efficiency are not usually a problem. However, nitrogen oxides emissions, usually referred to as $NO_x$, are a problem because the high temperatures generated in such prior art processes favor the production of $NO_x$. A gas turbine engine employed in an automobile or other vehicle will be operated over a wide range of varying operating conditions including idle, low speed, moderate speed, high speed, acceleration, and deceleration. These varying conditions create serious problems in controlling both $NO_x$ and CO emissions. Frequently, when a combustor is operated for the control of one of $NO_x$ or CO emissions, control of the other is lost. Both must be controlled. Thus, there is a need for a combustor of practical and/or realistic design, which can be operated in a manner such that the pollutant emissions therefrom will meet said EPA standards. Even a combustor, and/or a combustion process, giving reduced pollutant emissions approaching said standards would be a great advance in the art. Such a combustor, or process, would have great potential value because it is possible the presently very restrictive EPA standards may be relaxed even further than has been recently indicated.

The present invention solves the above-described problems by providing new combustors, and methods of operating same, which produce lower emissions, particularly lower emissions of nitrogen oxides (usually referred to as $NO_x$) and CO. The combustors of the invention can be operated over widely varying operating conditions with reduction and control of both $NO_x$ and CO emissions. In the methods of the invention the control of both $NO_x$ and CO emissions is accomplished by introducing a variable volume of a first stream of air into a first combustion region, and supplying tangentially introduced streams of air to said first combustion region and a second combustion region of the combustor. In operation, the combustors of the invention are characterized by remarkable combustion stability over a wide range of operating conditions.

Thus, according to the invention, there is provided a combustor comprising, in combination: a flame tube; a dome member disposed at the upstream end of said flame tube; an air-assisted fuel inlet means disposed in said dome member for introducing a stream of fuel into an upstream first combustion section of said flame tube; a variable first air inlet means provided in said dome member for admitting a variable volume of a first stream of air through said dome member, around said fuel inlet means, and into said first combustion section of said flame tube; a second air inlet means disposed in the wall of said flame tube for tangentially admitting a second stream of air into said first combustion section tangential to the wall thereof; a third air inlet means disposed in the wall of said flame tube downstream from said second air inlet means for tangentially admitting a third stream of air into a second combustion section located in said flame tube downstream from and in communication with said first combustion section; and means for varying the pressure, or the volume, of a stream of assist air to said fuel inlet means in accordance with the rate of introduction of said fuel.

Further according to the invention there is provided a combustor comprising, in combination: a flame tube; a dome member disposed at the upstream end of said flame tube; a fuel inlet means disposed in said dome member for introducing a fuel into an upstream first combustion section of said flame tube; a variable first air inlet means provided in said dome member for admitting a variable volume of a first stream of air through said dome member and into said first combustion section of said flame tube; a second air inlet means disposed in the wall of said flame tube for tangentially admitting a second stream of air into said first combustion section tangential to the wall thereof; a third air inlet means disposed in the wall of said flame tube downstream from said second air inlet means for tangentially admitting a third stream of air into a second combustion section located in said flame tube downstream from and in communication with said first combustion section; and an annular radially extending wall member extending into said flame tube adjacent the downstream edge of said second tangential slots.

Still further according to the invention, there is provided a method for the combustion of a fuel in a combustion zone having a first upstream combustion region and a second combustion region located adjacent, downstream from, and in communication with said first combustion region, which method comprises: introducing a stream of fuel together with a stream of assist air into the upstream end portion of said first combustion region: introducing a first stream of air at a controlled but variable rate into said upstream end portion of said first combustion region; tangentially introducing a second stream of air into said first combustion region and forming a combustible mixture of said fuel and said streams of air; causing at least partial combustion of said combustible mixture and forming hot combustion products; tangentially introducing a third stream of air into said second combustion region; controlling said variable rate of introduction of said first stream of air in accordance with the rate of introduction of said fuel; and controlling the pressure, or the volume, of said stream of assist air in accordance with the rate of introduction of said fuel.

Figure 14:
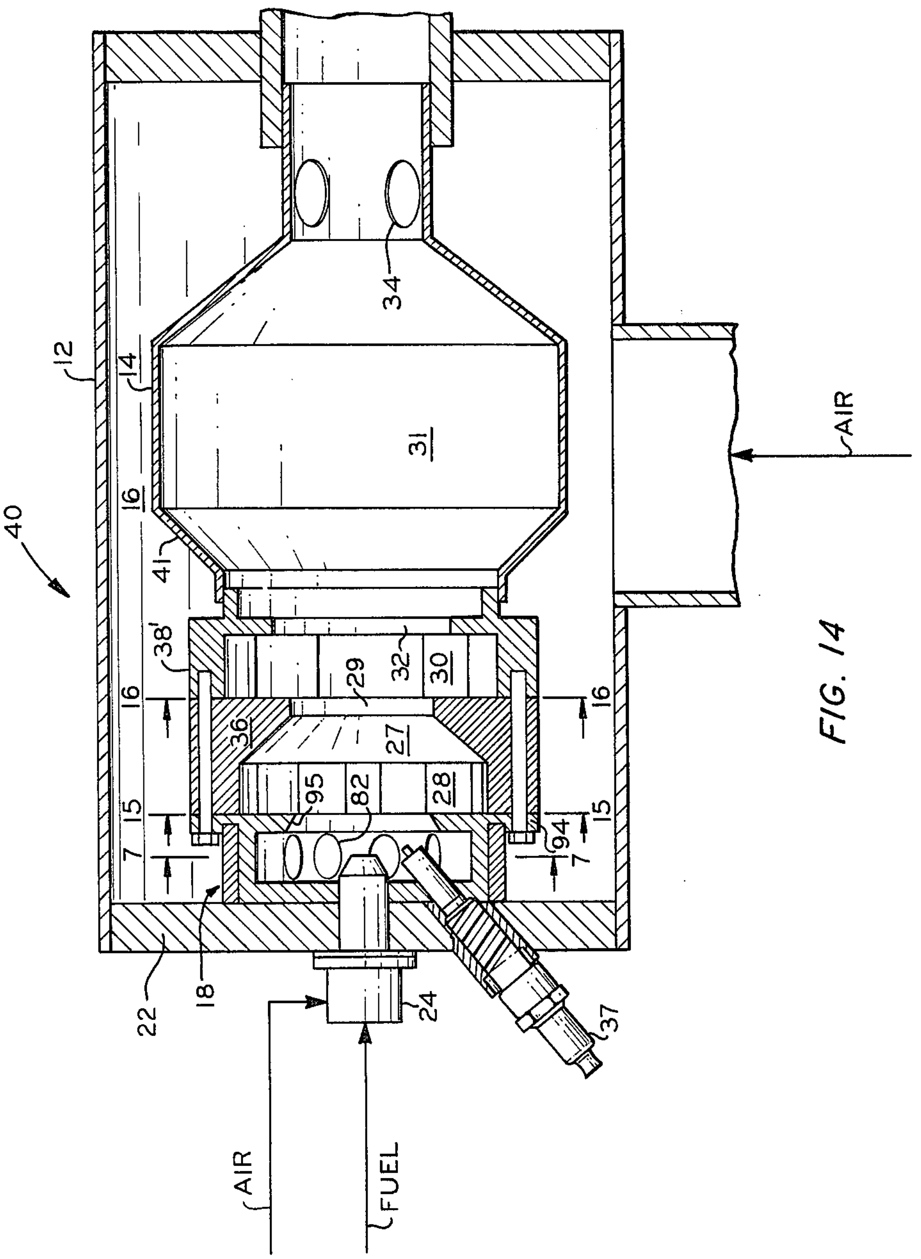
FIG. 14 is a view, partly in cross section, of a combustor employed for comparison purposes in evaluating the combustors of the invention.
Figure 16:
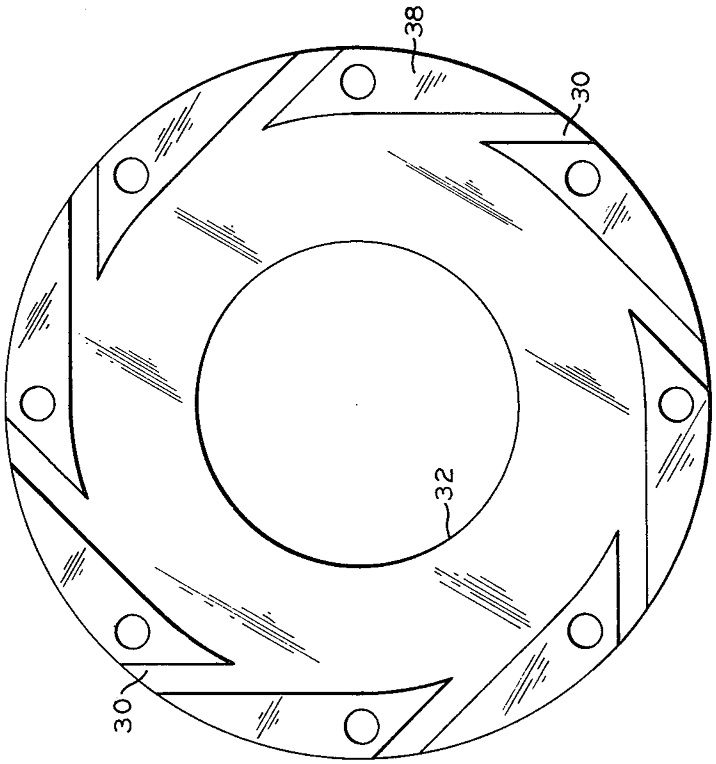
Figure 15:
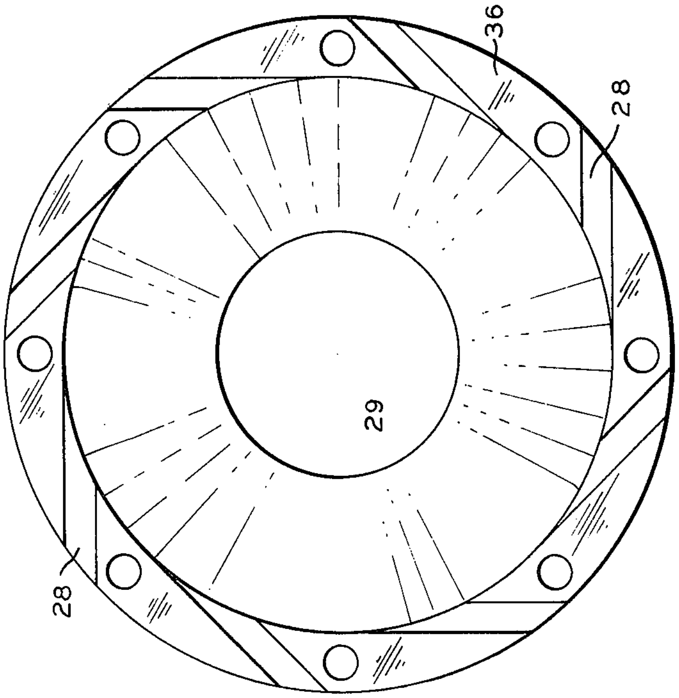

FIGS. 15 and 16 are enlarged views, in elevation, taken along the lines 15—15, and 16—16, respectively, of FIG. 14.

Figure 17:
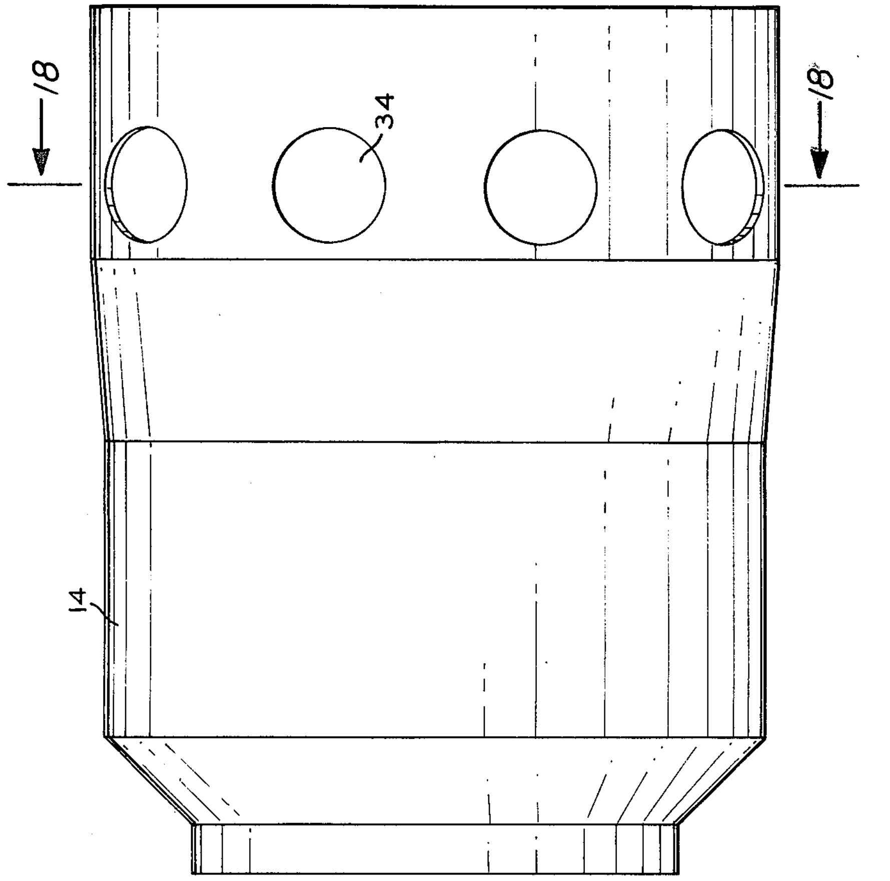

FIG. 17 is a top plan view of the downstream portion of the flame tube of the combustor of FIG. 14.

Figure 18:
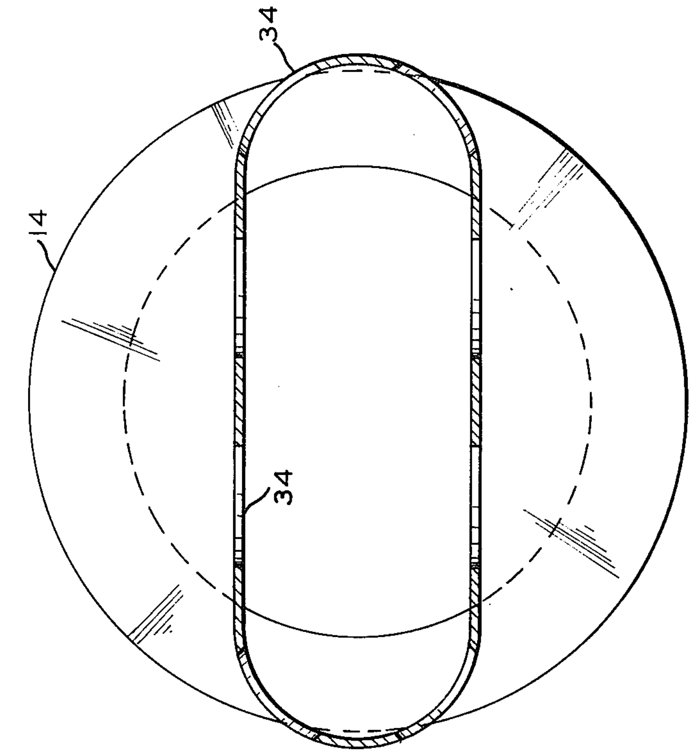

FIG. 18 is a sectional view taken along the line 18—18 of FIG. 17 when rotated 90°.

Referring now to the drawings, wherein like or similar reference numerals are employed to denote like or similar elements, the invention will be more fully explained.

Figure 1:
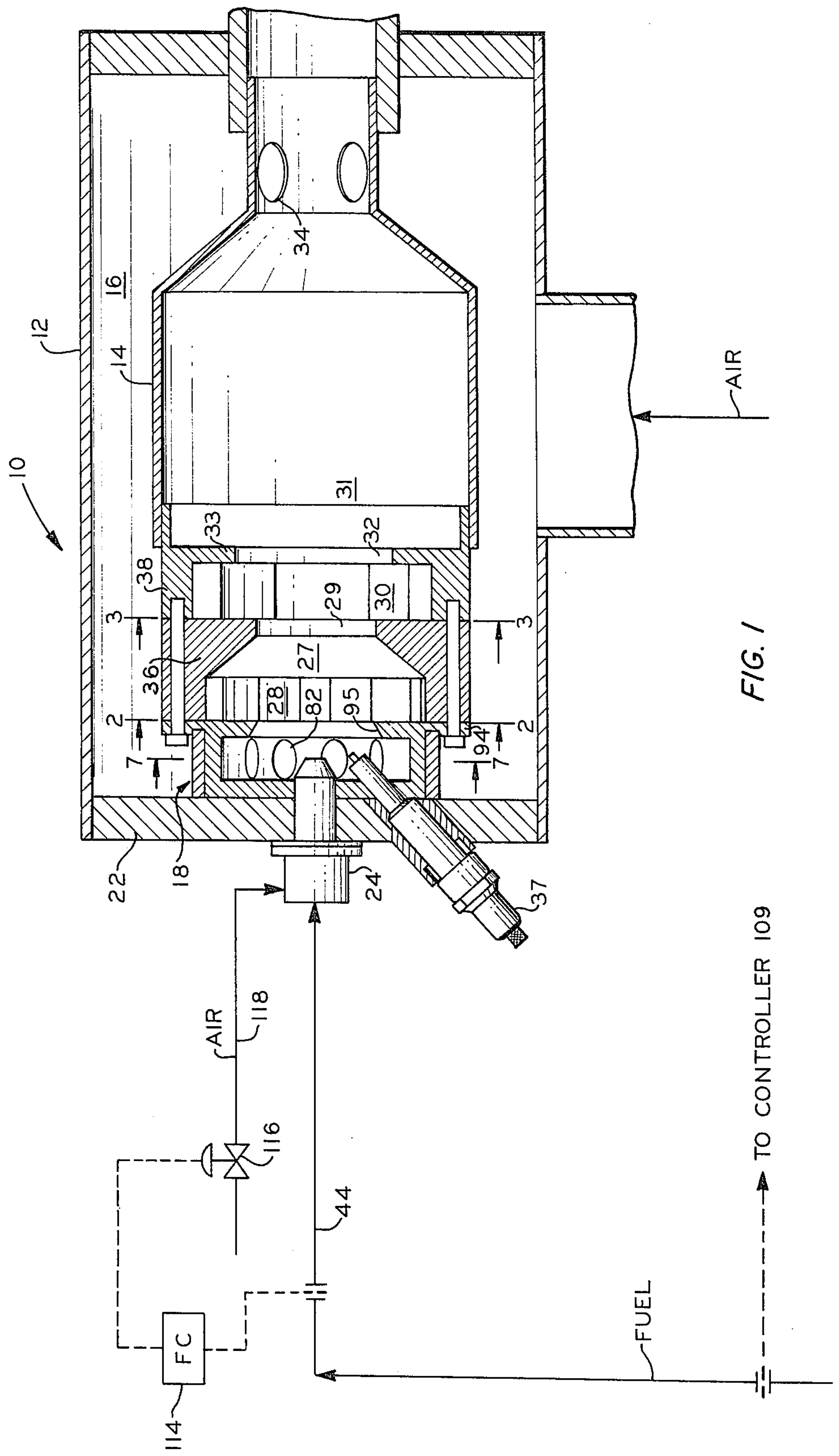
FIG. 1 is a view, partially in cross section, of a combustor in accordance with the invention.
Figure 3:
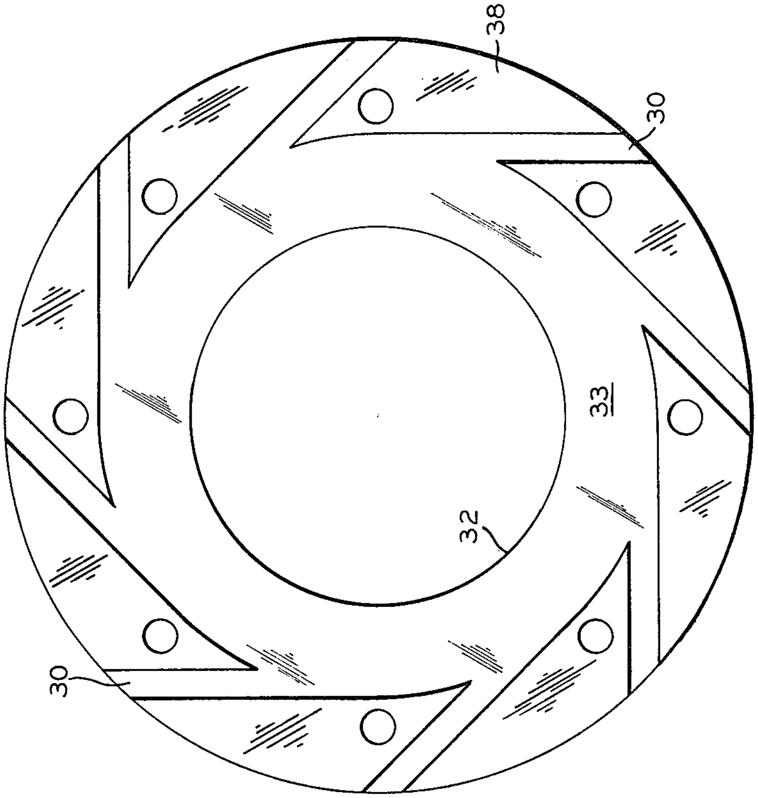
FIG. 3 is an enlarged view, in elevation, taken along the line 3—3 of FIG. 1 and illustrating another set of tangential entry ports or slots.
Figure 2:
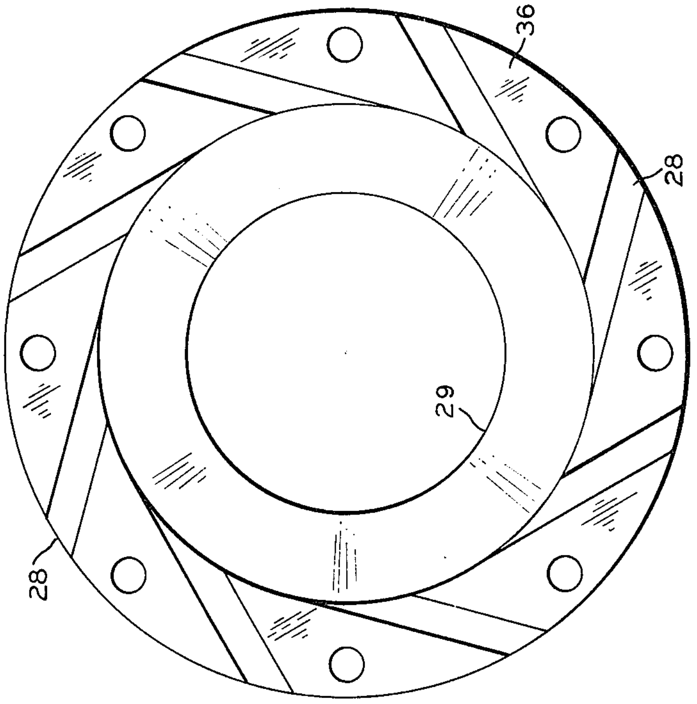
FIG. 2 is an enlarged view, in elevation, taken along the line 2—2 of FIG. 1 and illustrating one set of tangential entry ports or slots.

FIGS. 1-7, inclusive, 9, and 10 illustrate a combustor in accordance with the invention. Said combustor is denoted generally by the reference numeral 10. Preferably, said combustor comprises an outer housing or casing 12 having a flame tube 14 disposed, preferably concentrically, therein and spaced apart from said casing to form an annular chamber 16 between said casing 12 and said flame tube 14. Said flame tube can be supported in said housing or casing by any suitable means. While it is preferred to provide the combustor with an annular casing or housing, similarly as illustrated, so as to provide said annular space 16 for supplying air to the various inlets (described hereinafter) in said flame tube, it is within the scope of the invention to alter the configuration of said housing or casing, or to omit said housing or casing and supply said air inlets individually by means of individual conduits. Said flame tube 14 is provided at its upstream end with a dome member 18. A fuel inlet means is provided for introducing a stream of fuel into the upstream end portion of said flame tube. As illustrated in FIG. 1, said fuel inlet means comprises a fuel conduit 44 leading from a source of fuel and extending into communication with fuel nozzle 24 mounted in fuel flange 22 which closes the upstream end of casing 12. Said fuel nozzle extends into said dome member 18. An annular orifice means is disposed on the downstream side of said dome member 18. Said orifice means can preferably be formed integrally with said dome member as here illustrated and can preferably comprise an annular flange 94 for mounting the downstream end of said dome member 18 onto the upstream end of said flame tube 14. A first orifice 95 formed in said orifice means can be considered to define the outlet from said dome member 18 and the inlet into the first combustion region 27.

A variable first air inlet means is provided in said dome member for admitting a variable volume of a first stream of air through said dome member, around said fuel inlet nozzle 24, and into said first combustion region 27 of said flame tube. As described further hereinafter, said variable first air inlet means comprises at least one air passage means of variable cross-sectional area provided in and extending through said dome member 18 into communication with said first combustion region 27, and means for varying the cross-sectional area of said air passage means and thus controlling the volume of said first stream of air admitted to said first combustion region. A second air inlet means is disposed in the wall of said flame tube for tangentially admitting a second stream of air into said first combustion region 27 tangential to the wall thereof. Said second air inlet means preferably comprises a plurality of tangential slots 28 extending through the wall of the upstream end portion of said flame tube 14 at a first station in the flame tube adjacent said outlet from said dome member 18. A third air inlet means is disposed in the wall of said flame tube downstream from said second air inlet means for tangentially admitting a third stream of air into a second combustion region 31 located in said flame tube 14 adjacent, downstream from, and in communication with said first combustion region 27. Said third air inlet means preferably comprises a plurality of tangential slots 30 extending through the wall of an intermediate portion of said flame tube 14 at a second station in the flame tube adjacent and downstream from a second orifice 29 which can be considered to define the outlet from said first combustion region. A third orifice 32 is disposed in said flame tube adjacent and downstream from said tangential slots 30. Preferably, a fourth air inlet means, comprising at least one opening 34, is provided in the wall of said flame tube at a third station downstream from said third air inlet means 30 and said third orifice 32 for admitting a fourth stream of air comprising quench or dilution air into said flame tube 14.

Said flame tube 14 can be fabricated integrally if desired. However, for convenience in fabrication, said flame tube can preferably be formed with its wall divided into separate sections similarly as here illustrated. Thus, in one preferred embodiment said tangential slots 28 can be formed in an upstream first wall section 36 of said flame tube, preferably in the upstream end portion of said first wall section with the downstream wall of said flange 95 forming the upstream walls of said slots 28. In this preferred embodiment said second orifice 29 is formed in the downstream end portion of said first wall section 36. In said preferred embodiment said tangential slots 30 can be formed in an intermediate second wall section 38 located adjacent and downstream from said first wall section 36. Preferably, said second wall section 38 is disposed with its upstream edge contiguous to the downstream edge of said first wall section 36, and said tangential slots 30 are formed in the upstream end portion of said second wall section 38 with the downstream edge of said first wall section 36 forming the upstream walls of said slots 30. In this preferred embodiment said third orifice 32 is formed in said second wall section 38 and adjoins said slots 30 formed therein. Preferably, the inner wall surface of said first wall section 36 tapers inwardly from the downstream edge of said tangential slots 28 to the upstream edge of said second orifice 29 to form an inwardly tapered passageway from said slots to said orifice. Preferably, the downstream end of said second wall section 38 comprises an annular radially extending wall member 33 which extends into said flame tube with said third orifice 32 being formed in said wall member 33, and with the upstream surface of said wall member 33 comprising at least a portion of the downstream walls of said slots 30. Said annular wall member 33 provides for the abrupt expansion of hot combustion products flowing from first combustion region 27 to second combustion region 31.

It will be understood that the combustors described herein can be provided with any suitable type of ignition means and, if desired, means for introducing a pilot fuel to initiate combustion. For example, a sparkplug 37 can be mounted to extend through flange 22 and the upstream end of dome member 18 as shown.

Referring to FIG. 1, for example, in the combustors of the invention the first combustion region can be considered to be the region from the downstream tip of fuel nozzle 24 to the midpoint of the tangential slots 30, and the second combustion region can be considered to be the region from the midpoint of said tangential slots 30 to the midpoint of the openings 34.

Said second orifice 29 and said third orifice 32 have been illustrated as being circular in shape and this is usually preferred. However, it is within the scope of the invention for either or both of said orifices to have other shapes. Similarly, flame tube 14 and the various sections thereof will usually be generally circular in cross-section and this is preferred. However, it is within the scope of the invention for said flame tube to be other than circular in cross-section, e.g., hexagonal.

Referring to FIGS. 4, 5, 6, and 7, said dome member 18 can comprise a fixed generally cylindrical member 80 (see FIG. 6) closed at one end and open at the other end. A plurality of openings 82 are provided at spaced apart locations around the circumference of said cylindrical member 80 adjacent the closed end thereof. An opening 84 is provided in said closed end for receiving a fuel inlet nozzle, e.g., nozzle 24 of FIG. 1, which extends through the flange 22 of housing or outer casing 12. The outlet of said fuel nozzle would be positioned similarly as shown for nozzle 24 in FIG. 1. Said fuel inlet nozzle can be any suitable type of fuel nozzle. As here shown it is an air assist fuel nozzle of conventional design wherein air is used in atomizing the fuel. Another opening 88 is provided in said closed end for receiving an igniter means, such as spark plug 37 in FIG. 1, which also extends through said flange 22. Openings 92 are provided for receiving mounting bolts (not shown) for mounting the dome member on said flange 22 and within housing or casing 12. Preferably, a mounting flange 94 is connected to and provided around the open end of said cylindrical member 80 for mounting said member 80 on the upstream end of a flame tube, e.g., flame tube 14 in FIG. 1. Preferably, a groove 96 is provided in said flange 94 around the open base of said cylindrical member 80. A pair of spaced apart stop pins 98 project from said flange 94 perpendicular thereto and adjacent said cylinder member 80. An orifice 95, preferably tapered inwardly, is provided in said flange 94 adjacent and in communication with the open end of said cylindrical member 80. Thus, said flange 94 comprises an orifice means with said orifice 95 defining the outlet from said dome member.

Figure 7:
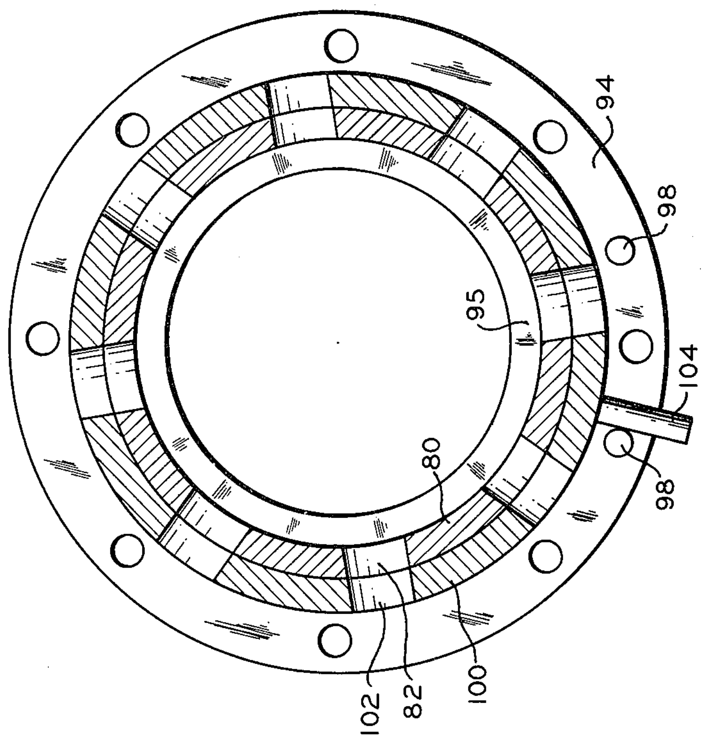
FIG. 7 is a sectional view taken along the line 7-7 of FIG. 1.
Figure 5:
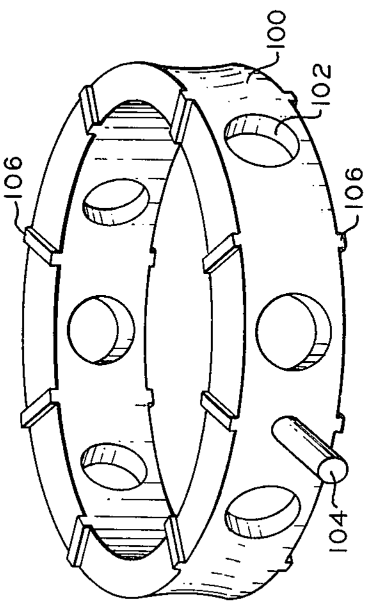
FIG. 5 is a perspective view further illustrating an element of the dome member of the combustor of FIG. 1.
Figure 6:
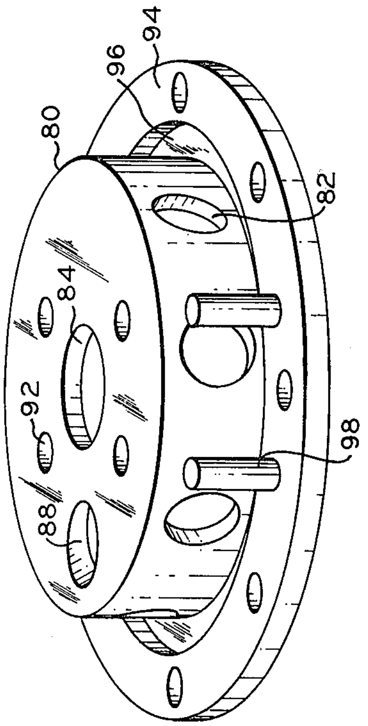
FIG. 6 is a perspective view further illustrating another element of the dome member of the combustor of FIG. 1.
Figure 10:
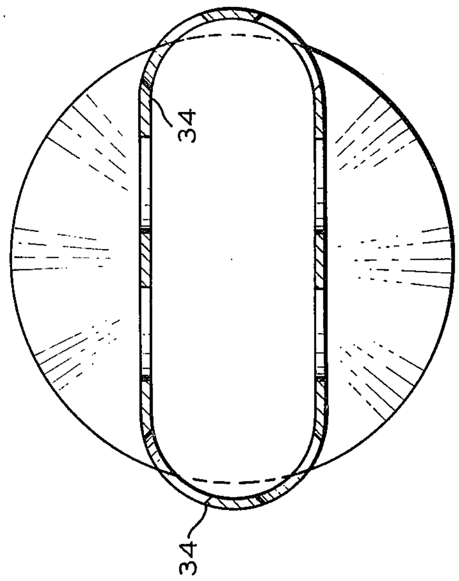
FIG. 10 is a sectional view taken along the line 10—10 of FIG. 9.
Figure 9:
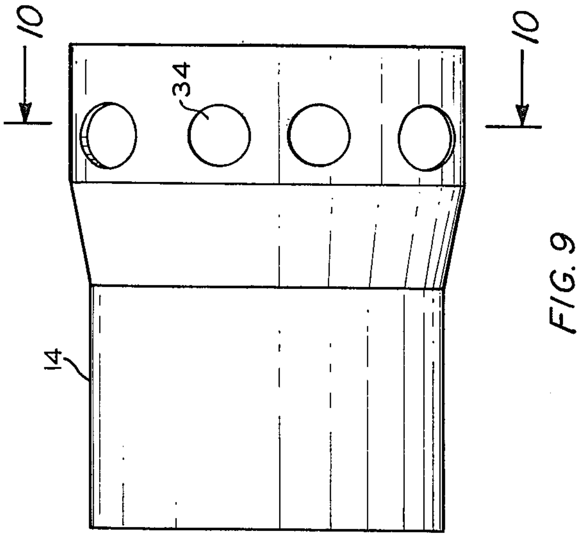
FIG. 9 is a top plan view of the downstream portion of the flame tube of the combustor of FIG. 1.

The adjustable throttle ring 100 of FIG. 5 is mounted around said cylindrical member 80 and is provided with a plurality of spaced apart openings 102 therein of a size, number, and shape and at spaced apart locations, corresponding to said openings 82 in cylindrical member 80. Said throttle ring fits into groove 96 in flange 94. An actuator pin 104 projects outwardly from the outer surface of said throttle ring 100 and coacts with said stop pins 98 to limit the movement of said ring 100. Friction lugs 106 can be provided on the top and the bottom of said ring 100 for movably bearing against the inner surface of flange 22 in housing 12 and the bottom of groove 96, respectively. FIG. 7 is a cross section of ring 100 mounted on member 80.

Figure 8:
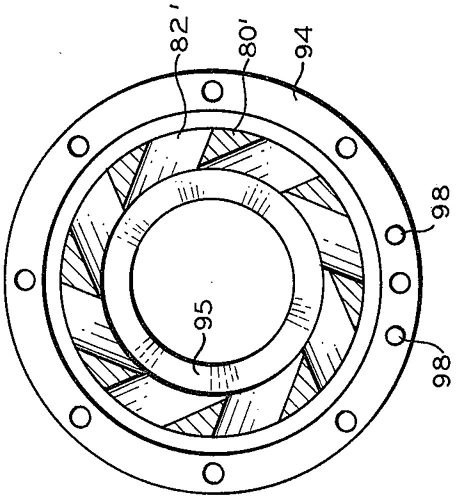
FIG. 8 is a sectional view, taken through a location corresponding to that of FIG. 7, and illustrating features of another dome member which can be employed on the combustors of the invention and in the operation of said combustors.

FIG. 8 illustrates a modified cylindrical member 80' which can be employed in a modification of said dome or closure member 18. Said modified cylindrical member 80' is essentially like the cylindrical member 80 shown in FIGS. 6 and 7 except that openings 82' in the modified cylindrical member 80' extend tangentiallly therethrough instead of radially. It will be understood that the corresponding openings in the corresponding modified throttle ring (not shown) which is employed with said modified cylindrical member 80' are correspondingly tangential.

In accordance with the invention, it has been found that when the combustors of the invention are provided with air assist fuel inlet nozzles, or with any other air assist fuel introduction means, it is desirable to control the amount of air supplied to the fuel nozzle in accordance with the fuel flow to said nozzle. Any suitable control means can be employed for this purpose and the specific means illustrated in FIG. 1 forms no part, per se, of the invention and can be modified or substituted for as desired. As shown diagrammatically in FIG. 1, the flow controller 114 actuates valve 116 in air conduit 118 responsive to the flow of fuel through the orifice in fuel conduit 44 to program an increase in air flow to nozzle 24 to accompany an increase in fuel flow, or vice versa. Said valve 116 can be a flow control valve for controlling volume of flow, or a pressure regulator valve for holding a constant pressure in the conduit downstream therefrom and to fuel nozzle 24.

Figure 4:
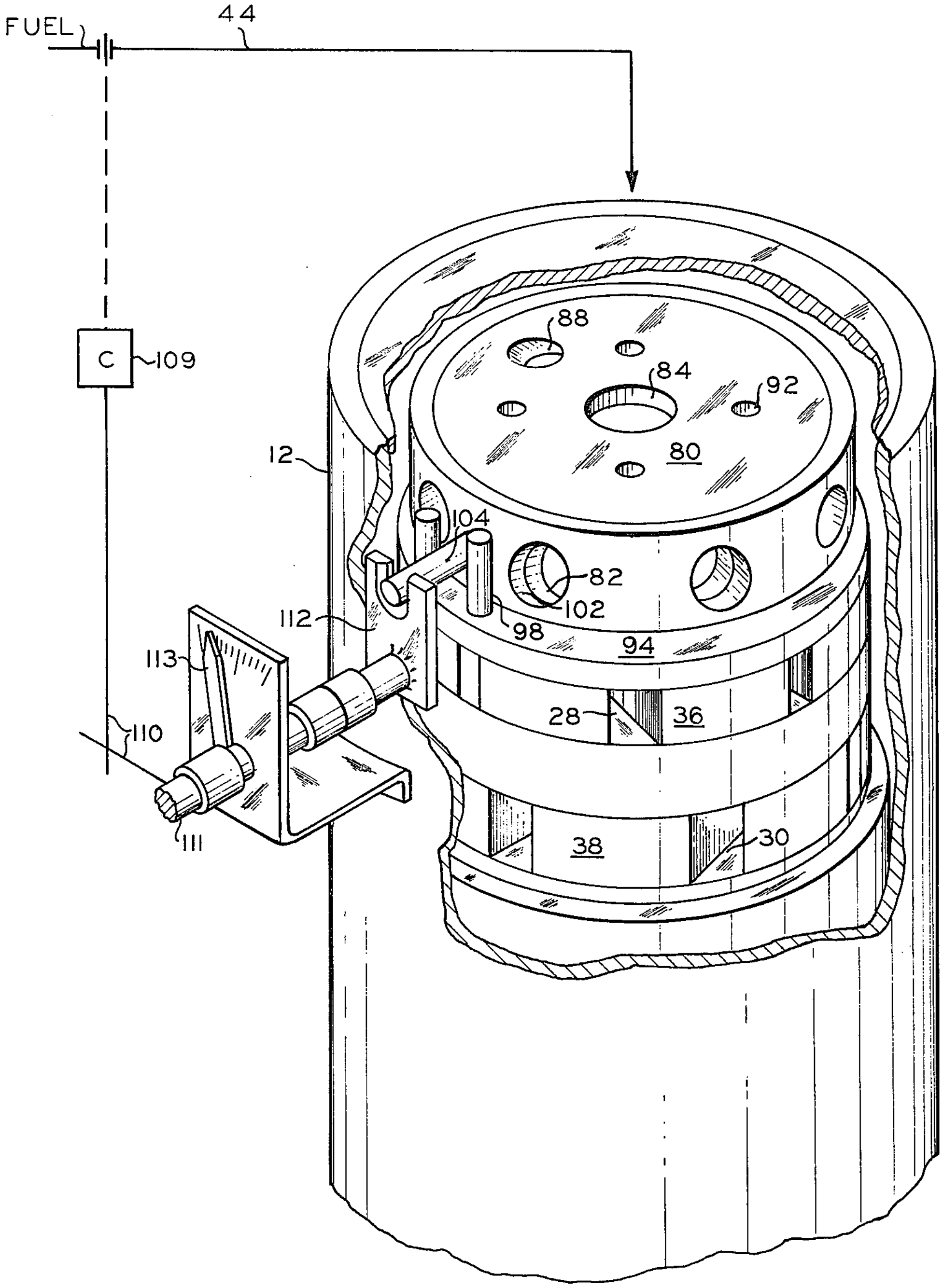
FIG. 4 is a diagrammatic perspective view, partially cut away, of the upstream end of the combustor of FIG. 1 showing the flame tube and dome member of the combustor, and further illustrating certain operational features thereof.

Further in accordance with the invention, it has been found that when the combustors of the invention are provided with variable dome means, such as dome 18 in FIGS. 1 and 4, it is desirable to control the effective open area of the air inlet openings in said dome member in accordance with fuel flow to the combustor. Any suitable control means can be provided for this purpose and, referring now to FIG. 4, the specific means there illustrated forms no part, per se, of the present invention and can be modified or substituted for by any means known in the art. As shown diagrammatically in FIG. 4, controller 109, responsive to the flow of fuel through the orifice in fuel conduit 44, actuates linkage 110, which is operatively connected to control rod 111, and programs rotation of said control rod in one direction or the other. Yoke member 112 is fixed to the inboard end of rod 111 inside of housing 12. The U-shaped recess in one end of yoke member 112 coacts with actuator pin 104 to cause rotation of throttle ring 100 within the limits of the space between stop pins 98 and thus adjust the effective size of the opening provided by openings 82 and 102. As here shown, said openings 82 and 102 are in direct register with each other to provide the maximum opening into dome member 18. Indicator pin 113 is provided to indicate the degree of rotation of throttle ring 100.

In one method of operating the combustors of the invention, e.g., the combustor of FIG. 1, a first stream of air is introduced through dome member 18 at a controlled rate into first combustion region 27 of the combustor. In the combustor of FIG. 1 said first stream of air is introduced generally radially with respect to said first combustion region. However, as discussed hereinafter, it is within the scope of the invention to introduce said first stream of air in an axial direction. A stream of fuel is introduced, preferably axially, into said first combustion region 27. In one embodiment, said fuel is sprayed into said first combustion region as a hollow cone and said first stream of air is introduced around the stream of fuel and intercepts said cone. The rate of introduction of said first stream of air is controlled in accordance with the rate of introduction of said stream of fuel, as described elsewhere herein.

A second stream of air is tangentially introduced into said first combustion region 27 via tangential slots 28 in a direction tangential the wall of said first combustion region. Said slots 28 thus impart a swirl to said second stream of air. The direction of said swirl can be either clockwise or counterclockwise. When employing the slots illustrated in FIG. 2, the direction of swirl will be clockwise, looking downstream in the flame tube. Said first and second streams of air form a combustible mixture with said fuel, and at least partial combustion of said mixture is caused in said first combustion region. Hot combustion products and any remaining said mixture are passed from said first combustion region 27, through orifice 29, and into second combustion region 31.

A third stream of air is tangentially introduced into said second combustion region via tangential slots 30 in a direction tangential the wall of said second combustion region. Said slots 30 thus impart a swirl to said third stream of air. The direction of swirl imparted to said third stream of air can be either clockwise or counterclockwise, but it is preferably opposite the direction of swirl imparted to said second stream of air by said slots 28. When employing the slots illustrated in FIG. 3, the direction of swirl of the third stream of air will be counterclockwise, looking downstream of the flame tube. Said third stream of air surrounds said hot combustion products and any remaining mixture entering from the first combustion region, and mixes therewith. Combustion is essentially completed in said second combustion region.

Preferably, a fourth stream of air is introduced via openings 34 and mixes with combustion products leaving said second combustion region. Said fourth stream of air comprises quench or dilution air. The hot combustion gases then exit the combustor to a turbine or other utilization.

FIG. 14 illustrates a combustor, designated generally by the reference numeral 40, which was employed for comparison purposes in evaluating the performance of the combustors of the invention. A principal difference between said combustor 40 and combustors of the invention, e.g., combustor 10 of FIG. 1, is that in combustor 40 a tapered connecting section 41 is provided for connecting the downstream end of second wall section 38′ of flame tube 14 to the enlarged portion of said flame tube. Another difference between said combustors 40 and 10 is that combustor 40 (FIG. 14) is not provided with means for controlling air flow to fuel nozzle 24 in accordance with fuel flow to said nozzle.

The operation of said combustor 40 is substantially like that described above for combustor 10 of FIG. 1 except that (1) the air flow (pressure) to the fuel nozzle is not controlled in accordance with the fuel flow; and (2) in combustor 40 the hot combustion products flowing from first combustion region 27 to second combustion region 31 are not abruptly expanded essentially immediately after entry into said second combustion section. In combustor 10 of FIG. 1 the abrupt expansion of hot combustion products which occurs downstream from wall member 33 causes turbulent eddy currents to be set up downstream from said wall member 33. Said eddy currents serve as flame holders and/or flame stabilizers.

Figure 12:
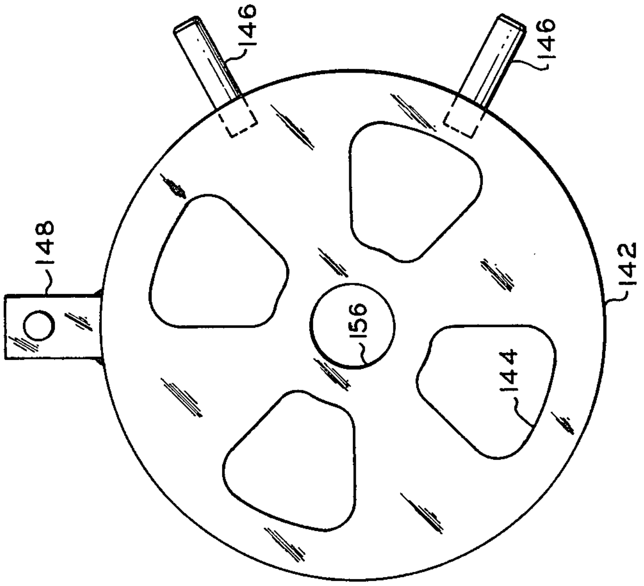
FIG. 12 is an enlarged view in elevation of an element of the dome member shown in FIG. 11.
Figure 13:
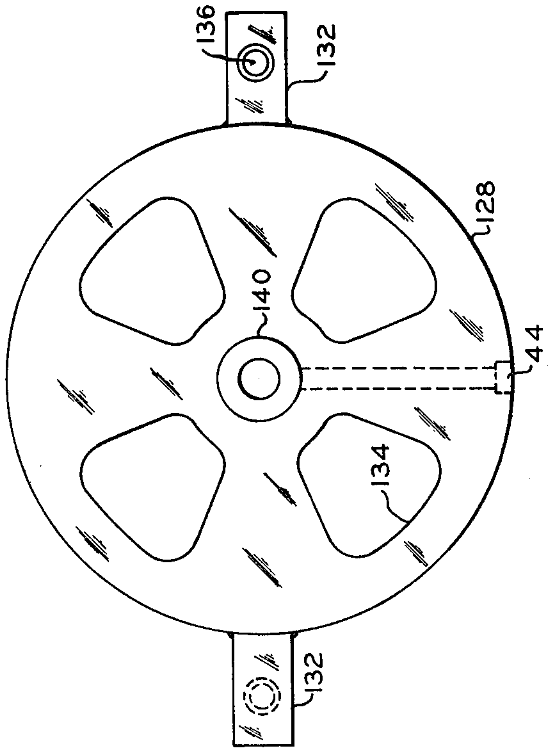
FIG. 13 is an enlarged view in elevation of another element of the dome member shown in FIG. 11.

Any other suitable variable dome means can be employed, in combination, in the combustors of the invention instead of the above-described dome member 18. For example, referring to FIGS. 11, 12, and 13, said dome member can comprise a dome member 120 which comprises a fixed circular back plate 128 centrally mounted, by means of a pair of mounting bars 132, in an opening provided in a fuel flange 130. A plurality of spaced apart openings 134, arranged in a circle, are provided in said plate 128. A stop pin 136 projects perpendicularly from one of said bars 132. Referring to FIG. 1, flame tube 14 can be mounted in a tubular housing to provide an annular space 16′ between said flame tube and said housing. Said housing can be provided with a suitable flange adjacent the upstream end of said flame tube for connecting to the downstream side of said fuel flange 130. The upstream side of said fuel flange 130 can be connected to a suitable flange which in turn is connected to the end of an air conduit supplying air to said annular space 16′. The back or downstream side of said fixed plate 128 can be joined to the upstream side of flame tube 14, similarly as flange 94 is joined in FIG. 1. Said opening 138 in fuel flange 130 can then be in communication with said annular space 16′ and said air conduit for admitting air to said annular space 16′. A centrally disposed circular boss member 140 projects outwardly from the upstream face of said fixed plate 128 for receiving and mounting a front adjustable plate 142 thereon.

Said front plate 142 is circular-like, and of the same size as, said fixed plate 128. A plurality of spaced apart openings 144 are provided in said front plate 142 and correspond in size and circular arrangement to that of said openings 134 in backplate 128. A pair of spaced apart stop pins 146 project perpendicularly from the side of said front plate 142. An actuator tab 148 projects perpendicularly from one side of said front plate at a location spaced from said stop pins 146. Push rod 150 is pivotally connected to said actuator tab 148 in any suitable manner as shown. Said push rod 150 can be actuated in a back and forth manner by means of roller mechanism 152 mounted on the outside of fuel flange 130 in any suitable manner. Flexible shaft 154 extends through a control panel (not shown) and is connected to a rotatable knob (not shown) for movement of said shaft 154, said roller mechanism 152, and said rod 150 for rotating said front plate 142 within the limits imposed by stop pins 146 acting against stop pin 136.

Figure 11:
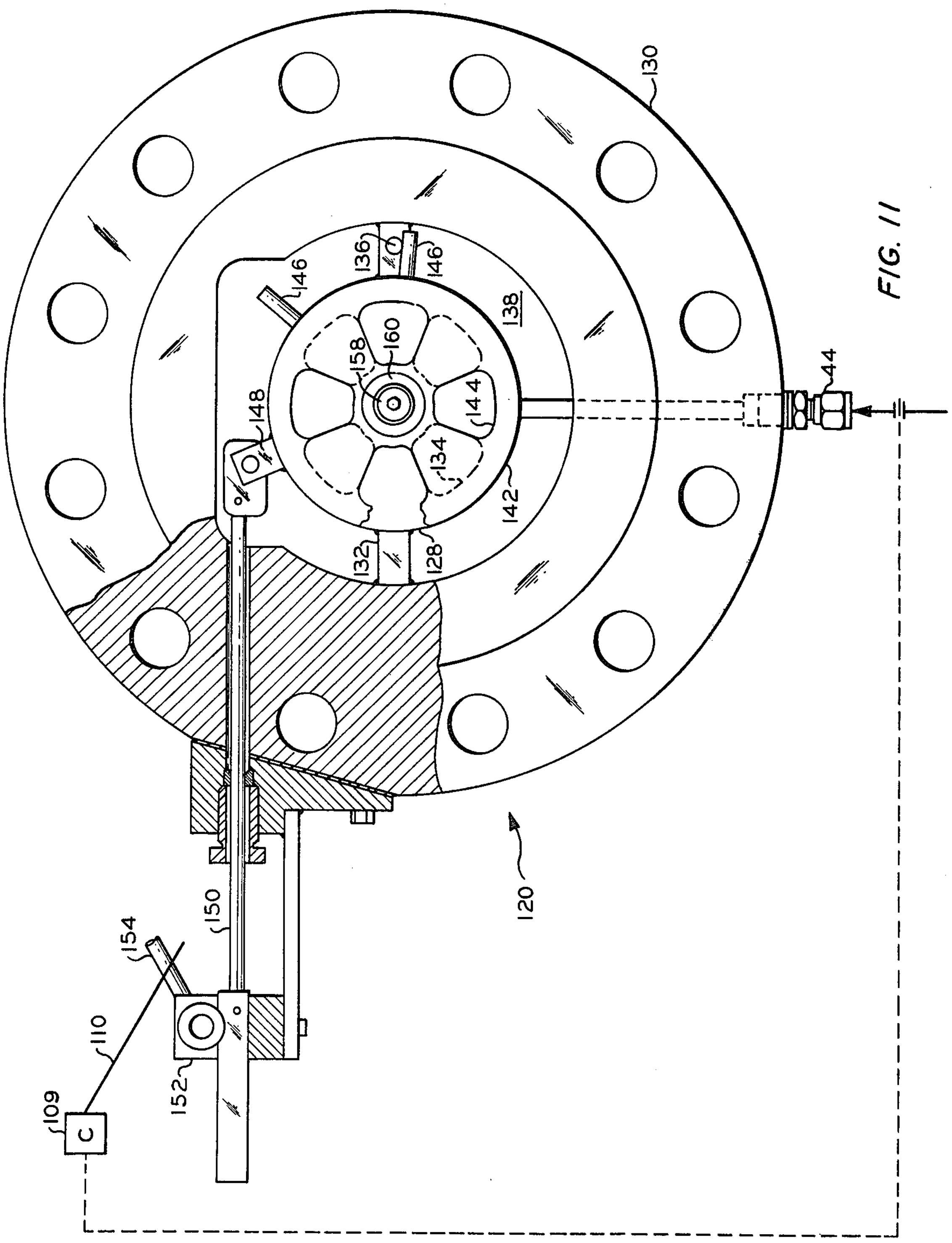
FIG. 11 is a view looking at the upstream side of another variable dome member which can be employed in the combustors of the invention.

In assembly, said fuel flange 130 is mounted between suitable adjacent flanges as described above. The upstream end of flame tube 14 is joined to backplate 128 directly as described above or by means of a suitable adaptor which in turn is secured to the downstream face of said fuel flange 130. Fuel conduit 44 extends through said flange 130 and communicates with a central cavity therein which is adapted to receive fuel nozzle 24 mounted therein. The central opening 156 in front plate 142 fits onto boss member 140 on backplate 128 and said front plate is held in sliding engagement with backplate 128 by means of cap screw 158 and washer 160. Said push rod 150, by virtue of the back and forth movement described above, rotates said front plate 142 to bring openings 144 therein into and out of register with openings 134 in said backplate 128 to thus vary the effective size of opening provided in variable dome 120 and vary the amount of air passed through said dome into first combustion section 27. As shown in FIG. 11, said openings 144 and 134 are out of register and the dome member is completely closed.

As discussed above in connection with the combustor of FIG. 1 and its variable dome member 18, it is also desirable to control the effective size of the openings in the variable dome 120 in accordance with fuel flow to the combustor to which it is connected. This can be accomplished manually by means of the push rod 150 and associated elements. However, in continuously operating combustors which operate over a varied range of operating conditions, such as a driving cycle as described in the examples hereinafter, it is desirable that the effective size of the dome openings be controlled automatically. Any suitable control means can be provided for this purpose, for example, the control means described above and illustrated in FIG. 4. Said control means can be adapted to a combustor provided with a dome member 120 by providing an orifice in fuel conduit 44, operatively connecting said orifice to a controller unit 109, and operatively connecting said controller unit by a suitable linkage 110, to shaft 154 of rack and roller mechanism 152 which moves push rod 150 back and forth. In the above-described methods of operation the relative volumes of the various streams of air can be controlled by varying the sizes of the said openings, relative to each other, through which said streams of air are admitted to the flame tube of the combustor. The above-described variable dome 18 of FIG. 1 and the variable dome of FIGS. 11, 12, and 13 can be employed to control the volume of one stream of air to the first combustion region. Flow meters or calibrated orifices can be employed in conduits supplying said other streams of air, if desired.

It is within the scope of the invention to operate the combustors or combustion zones employed in the practice of the invention under any conditions which will give the improved results of the invention. For example, it is within the scope of the invention to operate said combustors or combustion zones at suitable inlet air temperatures up to about 1500° F., or higher; at pressures within the range of from about 1 to about 40 atmospheres, or higher; at flow velocities within the range of from about 1 to about 500 feet per second, or higher; and at heat input rates within the range of from about 30 to about 1200 Btu per pound of air. Generally speaking the upper limit of the temperature of the air streams will be determined by the means employed to heat same, e.g., the capacity of the regenerator or other heating means, and materials of construction in the combustor and/or turbine utilizing the hot gases from the combustor. Generally speaking, operating conditions in the combustors of the invention will depend upon where the combustor is employed. For example, when the combustor is employed with a high pressure turbine, higher pressures and higher inlet air temperatures will be employed in the combustor. Thus, the invention is not limited to any particular operating conditions. As a further guide to those skilled in the art, but not to be considered as limiting on the invention, presently preferred operating ranges for other variables or parameters are: heat input, from 30 to 500 Btu/lb. of total air to the combustor; combustor pressure, from 3 to 10 atmospheres; and reference air velocity, from 50 to 250 feet per second.

The relative volumes of the above-described first, second, third, and quench or dilution air streams will depend upon the other operating conditions. Generally speaking, the volume of the first stream of air introduced into the first combustion region can be in the range of from 0 to 50, preferably about 0 to about 30, volume percent of the total air to the combustor when operating over a driving cycle, including idling, low speed, moderate speed, high speed, acceleration, and deceleration; the volume of the second stream of air can be in the range of from 0 to about 15, preferably about 5 to about 12, volume percent of the total air to the combustor; and the volume of the third stream of air can be in the range of from about 5 to about 25, preferably about 8 to about 18, volume percent of the total air to the combustor. When operating under substantially "steady state" conditions, such as in a stationary power plant or in turnpike driving, the volumes of said streams of air will depend upon the load, or the chosen speed of operation. The volume of the dilution or quench air can be any suitable amount sufficient to accomplish its intended purpose.

The air pressure to the air assist fuel nozzle, or other air assisted fuel introduction means, can be in the range of from 1 to 100, preferably 2 to 15, psig greater than the combustor operating pressure, preferably measuring the combustor pressure by the inlet air pressure to the combustor.

While in most instances, said first stream of air, said second stream of air, said third stream of air, and said dilution or quench air will originate from one common source such as a single compressor, it is within the scope of the invention for said streams of air to originate from different or separate sources. Separate heating means can be provided for heating the various streams of air, if convenient.

A number of advantages are realized in the practice of the invention. The combustors of the invention are low emission combustors. The invention provides small compact combustors which are particularly well suited to be employed in locations where space is important, e.g., under the hood of an automobile. Yet, the principles involved and the advances provided by the invention are applicable to combustors employed in larger power plants, e.g., large stationary gas turbine engines, boilers, etc. The variable domes employed in combination with the flame tubes in the combustors of the invention contribute to the overall efficiency of the combustors of the invention. Said variable dome is located in a relatively cool low stress region of the combustor, i.e., at the upstream end of the flame tube. Said variable dome is a small component comprising only one movable element which operates with only a small movement from a closed position to an open position. Thus, rapid response to changing operating conditions is provided. This combination of a variable dome with relatively small flame tubes in combustors of the invention renders said combustors of the invention particularly well suited for mobile installations. In contrast, the "variable hardware" of the prior art combustors usually provides for adjustments at a plurality of locations in the combustors, including adjustments to the hot flame tube itself. The result is usually a large, bulky, unit which in practical operation functions poorly, if at all.

While it is not intended to limit the invention as to any theories of operation, it definitely appears that the combustors of the invention are, to a large extent at least, self adjusting in operation. By this it is meant that the fuel-air mixtures produced and burned have characteristics of adjusting or varying in accordance with fuel flow. Referring to FIG. 1, at low fuel flows, e.g., idling, the flame stabilizes in the first combustion region 27. It is believed that the air introduced via tangential entry slots 28 has radial flow components, and other flow components, as well as the major tangential flow components. Said flow components apparently cause the creation of flame holding vortex actions and the flame stabilizes in the region(s) upstream of the inwardly tapered wall of the first combustion region 27. As fuel flow increases, and the amount of air introduced through the dome increases, the flame approaches orifice 29 and the other tangential air entry slots 30, a core of flame and hot combustion products is developed, and some of the air introduced via said slots 30 becomes involved. Under these conditions said core is isolated along the axis of the flame tube by the clockwise swirl of the air introduced via said slots 28. As fuel flow and dome air flow increase further, said core passes through orifice 29, past slots 30, and through orifice 32. The clockwise swirl is neutralized by the counterclockwise air from slots 30, and the flame stabilizes in second combustion region 31 adjacent and downstream from wall member 33. At high fuel flows and high dome air flows the flame penetrates further into said second combustion region 31 and is stabilized in the large central portion thereof. When the fuel flow is cut back, the flame retreats through the flame tube, the core is reformed, and the flame again stabilizes in the first combustion region because the dome air is also cut back when the fuel is cut back.

The above-described actions of the flame in the combustors of the invention have actually been observed by looking into the flame tube from the downstream end thereof. At low fuel flows and with the flame stabilized in the first combustion region, the flame is blue and the flame tube walls are red. The core is not luminous. When the flame is stabilized in the second combustion region, the flame has the appearance of a light blue haze at low $NO_x$ producing conditions.

The above-described actions of the flame in the combustion process of the invention are, to a large extent at least self-adjusting actions which are functions of the amount of fuel introduced, the control of the amount of dome air introduced in accordance with the amount of said fuel, and the tangentially introduced second and third streams of air. As shown by the examples given hereinafter, the combustors of the invention and the combustion process of the invention produce low emissions of $NO_x$, Co and HC. Thus, the invention solves one of the most serious problems in the design and operation of combustors and combustion processes for the production of low emissions, i.e., the problem of how to effectively handle the wide range of introduced air required when the combustor is operated over a wide range of conditions such as a driving cycle as described herein. Said solution is provided by the invention combination comprising: fuel injection, variable first air stream injection, and tangential second air stream injection into a first combustion region; and tangential third air stream injection into a second combustion region.

The following examples will serve to further illustrate the invention.

EXAMPLE I

A series of runs was carried out to evaluate the performance of combustor A, a combustor employed for comparison purposes in the evaluation of the combustors of the invention. The configuration of said combustor A was essentially like that illustrated in FIG. 14. Design details for said combustor A are set forth in Table I below. In this series of runs said combustor was operated over a test program consisting of five different driving conditions which simulate a vehicle traveling over a driving cycle. Said five driving conditions were deceleration (engine braking), idling, low road load, high road load, and acceleration. The conditions employed in each of said five driving conditions are set forth in Table II below.

At each of the five driving conditions, a series of runs was carried out wherein a stream of air was introduced into the first combustion region of the combustor flame tube via tangential entry slots 28, another stream of air was introduced into the second combustion region of said flame tube via tangential entry slots 30, and another stream of air was introduced into the quench region of the combustor via holes 34. The volumes of said streams of air were determined by the sizes of the openings admitting same. As shown in FIG. 14, said combustor A was provided with a variable dome member 18 whereby the amount of another stream of air admitted to the first combustion region 27 of the combustor could be varied and/or controlled in accordance with the fuel flow to said first combustion section.

In each series of runs carried out at each of the above-described five driving conditions, various manually adjusted dome openings (percent of total open entry area in the flame tube and the dome) were employed for admission of a variable volume of a first stream of air to the first combustion region 27, so as to determine the optimum open area in the dome for producing the lowest $NO_x$ emissions without losing control of the CO and HC emissions. In each of the runs the combustor was operated with the same air pressure drop across the air-assist fuel nozzle. The pressure of the air stream to fuel nozzle 24 was 5 psi greater than the combustor operating pressure (air inlet pressure) in each run.

During each run the exhaust gas from the combustor was analyzed under specifically controlled conditions to determine the concentration of $NO_x$, CO, and unburned hydrocarbon (HC). In general, in said analyses the SAE recommended sampling procedure was followed, i.e., "Procedure For The continuous sampling and Measurement of Gaseous Emissions From Aircraft Turbine Engines", Society of Automotive Engineers, Inc., New York, Aerospace Recommended Practice 1256, (October 1971).

From the raw data thus obtained, the emission index (pounds of pollutant produced per 1000 pounds of fuel burned) was calculated for $NO_x$, CO, and HC. Emission index values and other data from said test runs are set forth in Table III below. Emission ratio values, weighted over the entire driving cycle on the basis of time and weight of fuel burned for each driving condition were also calculated. Said emission ratio values provide a convenient overall evaluation of combustor performance.

EXAMPLE II

Another series of runs was carried out to evaluate the performance of combustor B, a combustor in accordance with the invention. Said combustor B had a configuration essentially like that of the combustor illustrated in FIG. 1, except that combustor B was not provided with the illustrated means for varying the volume, or pressure, of the air supplied to the air-assist fuel injection nozzle, in accordance with fuel flow, during the runs. Said combustor B was operated over a test program essentially like that described above in Example I. The pressure of the air stream to fuel nozzle 24 was 5 psi greater than the combustor operating pressure in each run. Emission index values and other data from said test runs are set forth in Table IV below.

EXAMPLE III

Two other series of runs were carried out employing a combustor in accordance with the invention. Said combustor had a configuration essentially like the combustor illustrated in FIG. 1, including means for varying the air pressure in conduit 118 to fuel nozzle 24 in accordance with the rate of fuel introduction. In the first series of said two other series of runs the air pressure in conduit 118 to fuel nozzle 24 was maintained at 2 psi greater than the combustor operating pressure in each run. In the second series of said two other series of runs the air pressure in conduit 118 to fuel nozzle 24 was maintained at 10 psi greater than the combustor operating pressure in each run. In each of said first and second series of runs, runs were carried out at each of the above-described five driving conditions employing various manually adjusted dome openings for admission of a variable volume of a first stream of air to the first combustion region 27, so as to determine the optimum open area in the dome for producing the lowest $NO_x$ emissions without losing control of the CO and HC emissions. Each of said series of runs was carried out in duplicate. In each run the combustor exhaust gases were analyzed and the raw data processed as in Example I.

Then, employing the data from the above Example II wherein the combustor was operated with 5 psi pressure drop across the fuel nozzle, the data from this Example III wherein the combustor was operated with 2 psi pressure drop across the fuel nozzle, and the data from this Example III wherein the combustor was operated with 10 psi pressure drop across the fuel nozzle, a curve was constructed for emissions production values ($NO_x$, CO, and HC) versus dome openings, for each of said pressure drop conditions.

From each of said curves a reading was then taken of the dome opening value where the lowest $NO_x$ emissions were produced without losing control of the CO and HC emissions. The thus selected values of $NO_x$, CO, and HC emissions were then employed to calculate emission index and emission ratio values for a composite combustor operated with a variable dome and with variable air pressure drop across the fuel nozzle, over the above described five driving conditions. The results of said calculations are set forth in Table V below where, for the purposes of this example, said composite combustor is identified as Combustor C.

EXAMPLE IV

The purpose of this example is to further evaluate the performance of Combustor C.

Referring to Example III above, from the curve for the runs carried out with 2 psi air pressure drop across the fuel nozzle, there was selected a constant dome opening value which would give the lowest $NO_x$ emissions at the lowest heat input rate (deceleration) employed in the above-described five condition driving cycle without losing control of CO and HC emissions, and still maintain stable combustion conditions. This dome opening value was at about 9.9 percent of the total combustor openings (dome openings plus flame tube openings). The thus selected dome open area value was then used in a series of runs consisting of a run at each of the five operating conditions of the above-described driving cycle. Each of said runs was carried out in a combustor essentially like the combustor of FIG. 1, and with a 2 psi air pressure drop across the fuel nozzle. In each run the exhaust gases from the combustor were analyzed as in Example I. From the raw data thus obtained, emission index and emission ratio values were calculated, as in Example I. The data thus represent operation of a combustor operated with a fixed dome and with a fixed air pressure drop across the fuel nozzle. The results of said runs are set forth in Table VI below.

EXAMPLE V

The purpose of this example is to further evaluate the performance of Combustor C.

Referring again to Example III above, from each of the three curves there constructed, and employing a fixed dome opening of 9.9 percent of the total combustor openings (dome openings plus flame tube openings), there was selected the air pressure drop value across the fuel nozzle which gave the lowest $NO_x$ emissions without losing control of the CO and HC emissions for each of the five driving conditions of the above-described driving cycle. The thus selected values of $NO_x$, CO, and HC emissions were then employed to calculate emission index and emission ratio values, as in Example I, for a composite combustor operated with a fixed dome and a variable air pressure drop across the fuel nozzle, over the above described five driving conditions. The results of said calculations are set forth in Table VII below.

Table I

| Combustor No. | Combustor Design A | B* | C* |
|---|---|---|---|
| Dome Air | Heated | | |
| Inlet type | Radial | | |
| Dist. from fuel inlet, in. | 0 | | |
| Hole diameter, in. | 0.75 | | |
| No. of holes | 8 | | |
| Total hole area, sq. in. | 0 to 3.53 | | |
| % Total comb. hole area | 0 to 22.7 | 0 to 21.2 | 0 to 21.2 |
| Exit orifice, diam. in. | 1.75 | 2.25 | 2.25 |
| Exit orifice area, sq. in. | 2.40 | 3.98 | 3.98 |
| Fuel Nozzle | Air Assist | | |
| Spray pattern | Cone | | |
| Spray angle, deg. | 70 | | |
| Air pressure, psia | 5 | | 2 to 12 |
| Flame Tube | | | |
| 1st. Station Air | Heated | | |
| Inlet type | Tangential | | |
| Dist. from fuel inlet, in. | 0.75 | | |
| Slots, in. | 0.25 × 0.50 | | |
| No. of slots | 8 | | |
| Tot. slot area, sq. in. | 1.00 | | |
| % Tot. comb.hole area | 8.3 to 17.9 | 7.6 to 6.0 | 7.6 to 6.0 |
| Exit orifice, diam. in. | 2.00 | 1.75 | 1.75 |
| Exit orifice area, sq. in. | 3.14 | 2.40 | 2.40 |
| 2nd Station Air | Heated | | |
| Inlet type | Tangential | | |
| Dist. from fuel inlet, in. | 2.87 | | |
| Slots, in. | 0.25 × 0.75 | | |
| No. of slots | 8 | | |
| Tot. slot area, sq. in. | 1.50 | | |
| % Tot. comb. hole area | 12.4 to 9.6 | 11.4 to 9.0 | 11.4 to 9.0 |
| Exit orifice, diam., in. | 2.50 | | |
| Exit orifice area, sq. in. | 4.91 | | |
| 3rd Station Air | Heated | | |
| Inlet type | Radial | | |
| Dist. from fuel inlet, in. | 10.50 | | |
| Tot. hole area, sq. in. | 9.55 | 10.67 | 10.67 |
| % Tot. comb. hole area | 79.3 to 61.3 | 81.0 to 63.8 | 81.0 to 63.8 |
| Combustor length, in. | 12.0 | | |
| 1st. comb. section, in. | 2.5 | | |
| 2nd. comb. section, in. | 8.0 | | |
| Combustor volume, cu. in. | 219 | 227 | 227 |
| 1st. comb. sect., cu. in. | 22 | 17 | 17 |
| 2nd. comb. sect., cu. in. | 177 | 190 | 190 |

*Like combustor A except for modifications shown

TABLE II

TEST CONDITIONS FOR EVALUATING COMBUSTOR PERFORMANCE

| Simulated Driving Cycle | | Combustor Operating Conditions | | | | |
|---|---|---|---|---|---|---|
| Operating Mode | Time, % Total | Inlet Air Pressure, in. Hg abs. | Inlet Air Temp., F. | Air[a] Flow, lb/sec. | Fuel[b] Flow, lb/hr. | Estimated Outlet Gas Temp., F. |
| Engine Braking | 11.4 | 46 | 1050 | 0.80 | 7 | 1220 |
| Curb Idle[c] | 36.1 | 46 | 975 | 0.75 | 10 | 1225 |
| Low Road Load[c] | 37.9 | 56 | 1150 | 0.96 | 17 | 1460 |
| High Road Load[c] | 8.8 | 78 | 1150 | 1.34 | 30 | 1540 |
| Compressor Acceleration | 5.8 | 58 | 1100 | 1.00 | 75 | 2400* |

*Steady operation at this high temperature will damage the combustor; therefore, emissions were measured at this condition with a fuel flow rate of 20, 30, and 40 lbs/hr. These data were used to estimate emissions at the desired fuel flow of 75 lbs/hr by extrapolation.

[a]Absolute humidity controlled at 75 grains of water vapor per pound of dry air.

[b]ASTM Jet A aviation-turbine kerosine.

[c]Curb idle = 0 to less than about 20 miles per hour; Low road load = from about 20 to about 40 mph; High road load = greater than about 40 mph.

Table III

Performance of Combustor A (Example I)

| Simulated Driving Condition | Emission Index, gm Pollutant/kgm Fuel $NO_x$ | CO | HC | Comb. Press. Drop % | Fuel Noz. Air Press[a] psi | Dome Open Area, % Total[c] |
|---|---|---|---|---|---|---|
| Deceleration | 3.67 | 13.76 | 0.44 | 2.6 | 5 | 5.3 |
| Idle | 2.80 | 13.36 | 0.34 | 1.9 | 5 | 14.8 |
| Low load | 0.23 | 9.97 | 0.34 | 2.1 | 5 | 17.5 |
| High load | 2.77 | 3.52 | 0.09 | 1.9 | 5 | 21.1 |
| Acceleration [a] | 8.32 | 0 | 0 | — | 5 | — |
| Fed. Driving Cycle, | | | | | | |

Table III-continued

Performance of Combustor A (Example I)

| Simulated Driving Condition | Emission Index, gm Pollutant/kgm Fuel NO$_x$ | CO | HC | Comb. Press. Drop % | Fuel Noz. Air Press[g] psi | Dome Open Area, % Total[e] |
|---|---|---|---|---|---|---|
| Emission Ratio [b] | 2.43 | 0.65 | 0.16 | | | |

[a] Extrapolated data

[b] Amount of pollutant emitted over simulated Fed. Dr. Cycle[c] / Amount of pollutant permitted by 1976 Statutory Requirement[d]

[c] Calculated for 10 mpg fuel economy

[d] 0.4 g/mi NO$_x$, 3.4 g/mi CO, and 0.41 g/mi Hc.

[e] % of total open area, dome plus flame tube

[g] Greater than combustor pressure

Table IV

Performance of Combustor B (Example II)

| Simulated Driving Conditions | Emission Index, gm Pollutant/kgm Fuel NO$_x$ | CO | HC | Comb. Press. Drop % | Fuel Noz. Air Press.[g] psi | Dome Open Area, % Total[e] |
|---|---|---|---|---|---|---|
| Deceleration | 3.27 | 18.34 | 0.24 | 2.6 | 5 | 8.7 |
| Idle | 3.10 | 5.90 | 0.28 | 2.1 | 5 | 11.4 |
| Low Load | 0.26 | 7.11 | 0.19 | 1.9 | 5 | 16.9 |
| High Load | 3.01 | 13.61 | 0.37 | 1.9 | 5 | 19.6 |
| Acceleration[a] | 3.35 | 0 | 0 | — | 5.0 | — |
| Fed. Driving Cycle, Emission ratio[b] | 1.59 | 0.58 | 0.13 | | | |

[a], [b], [c], [d], [e], & [g] - See footnotes of Table III

Table V

Performance of Combustor C[f] (Example III)

| Simulated Driving Condition | Emission Index, gm Pollutant/kgm Fuel NO$_x$ | CO | HC | Comb. Press. Drop % | Fuel Noz. Air Press.[g] psi | Dome Open Area, % Total[e] |
|---|---|---|---|---|---|---|
| Deceleration | 1.80 | 23.62 | 0.31 | 2.6 | 2.0 | 9.3 |
| Idle | 0.15 | 14.89 | 1.07 | 2.2 | 2.0 | 9.9 |
| Low Load | 0.32 | 5.05 | 0.09 | 2.0 | 5.0 | 16.1 |
| High Load | 3.22 | 8.91 | 0.17 | 1.8 | 85[h] | 19.5 |
| Acceleration[a] | 3.35 | 0 | 0 | — | 5.0 | — |
| Fed. Driving Cycle, Emission ratio[b] | 1.14 | 0.63 | 0.20 | | | |

[a], [b], [c], [d], [e], & [g] = See footnotes of Table III.

[f] Data given are the average of two runs.

[h] Average of 12.0 and 5.0.

Table VI

Further Evaluation of Performance of Combustor C (Example IV)

| Simulated Driving Condition | Emission Index, gm Pollutant/kgm Fuel NO$_x$ | CO | HC | Comb. Press. Drop % | Fuel Noz. Air Press.[g] psi | Dome Open Area, % Total[e] |
|---|---|---|---|---|---|---|
| Deceleration | 1.44 | 25.72 | 0.39 | 2.6 | 2 | 9.9 |
| Idle | 0.17 | 15.07 | 1.35 | 2.3 | 2 | 9.9 |
| Low Load | 7.62 | 3.95 | 0.00 | 2.1 | 2 | 9.9 |
| High Load | 18.75 | 5.00 | 0.00 | 1.8 | 2 | 9.9 |
| Acceleration[a] | 18.98 | 0.00 | 0.00 | — | 2 | 9.9 |
| Federal Driving Cycle, Emission Ratio[b] | 7.69 | 0.56 | 0.21 | | | |

[a], [b], [c], [d], [e], & [g] - See footnotes of Table III

Table VII

Further Evaluation of Performance of Combustor C (Example V)

| Simulated Driving Condition | Emission Index, gm Pollutant/kgm Fuel NO$_x$ | CO | HC | Comb. Press. Drop % | Fuel Noz. Air Press.[a] psi | Dome Open Area, % Total (e) |
|---|---|---|---|---|---|---|
| Deceleration | 1.44 | 25.72 | 0.39 | 2.6 | 2 | 9.9 |
| Idle | 0.17 | 15.07 | 1.35 | 2.3 | 2 | 9.9 |
| Low Load | 7.30 | 3.65 | 0.00 | 2.1 | 5 | 9.9' |
| High Load | 17.98 | 5.32 | 0.00 | 1.8 | 10 | 9.9 |
| Acceleration[a] | 18.13 | 0.00 | 0.00 | — | 10 | 9.9 |
| Federal Driving Cycle, Emission Ratio[b] | 7.36 | 0.56 | 0.21 | | | |

[a], [b], [c], [d], [e], & [g]- See footnotes of Table III

Referring to the above Tables III and IV, it is concluded from the data there set forth that combustor B is significantly superior to combustor A with respect to production of emissions because the emission ratio values for combustor B are significantly less than the emission ratio values for combustor A. A principal difference between combustors A and B is that the tapered connecting section 41 in the flame tube of combustor A (see FIG. 14) has been omitted in combustor B, and the flame tube of combustor B has been provided with the annular radially extending wall member 33 (see FIG. 1). Thus, it is further concluded that the omission of said tapered connecting section 41 and the abrupt expansion provided downstream from said wall member 33 contributed materially to the superior performance of combustor B.

Referring to the above Table V, and comparing the data there set forth for combustor C with the data set forth in Table IV for combustor B, it is concluded that combustor C is significantly superior to combustor B with respect to production of emissions because the emission ratio values for combustor C are significantly less than the emission ratio values for combustor B. Said combustor C illustrates a method of operation, in accordance with the invention, wherein the pressure, or the volume, of the assist air to an air-assisted fuel introduction means is controlled in accordance with the rate of fuel introduction. In the method of operation of combustor B the pressure of the assist air to the air-assisted fuel introduction nozzle was not varied in accordance with the rate of fuel introduction. Thus, it is concluded that controlling the air pressure drop across the fuel introduction nozzle of combustor C contributed materially to the superior showing of combustor C set forth in Table V.

Referring to the above Tables VI and VII, the data there set forth show the importance of the variable dome in the combination combustors of the invention, and the importance of varying the amount of air introduced into the first combustion region in accordance with fuel flow in the methods of the invention.

The term "air" is employed generically herein and in the claims to include air and other combustion-supporting gases.

The terms "combustion" and "partial combustion", when employed with reference to combustion of a fuel, are employed generically herein and in the claims, unless otherwise specified, to include not only the process of burning with a flame, but also to include other rapid oxidation processes or reactions which are not necessarily accompanied by a flame. Such "other rapid oxidation processes or reactions" are sometimes referred to as "pre-flame reactions" in the combustion art.

While the invention has been described above in terms of using a liquid fuel, the invention is not limited to the use of liquid fuels. It is within the scope of the invention to use vaporous or gaseous fuels, including prevaporized liquid fuels.

The design parameters set forth in the above Table I have been included for illustrative purposes and are not intended to be limiting on the invention.

Thus, while certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

I claim:

1. A combustor, comprising, in combination:

a flame tube;

a dome member disposed at the upstream end of said flame tube;

an air-assisted fuel inlet means disposed in said dome member for introducing a stream of fuel into an upstream first combustion section of said flame tube;

a variable first air inlet means provided in said dome member for admitting a variable volume of a first stream of air through said dome member, around said fuel inlet means, and into said first combustion section of said flame tube;

a second air inlet means disposed in the wall of said flame tube for admitting a second stream of air into said first combustion section in a circumferential direction and tangential to the wall thereof;

a third air inlet means disposed in the wall of said flame tube downstream from said second air inlet means for admitting a third stream of air into a second combustion section in a circumferential direction and tangential to the wall thereof, said second combustion section being located in said flame tube downstream from and in communication with said first combustion section; and means for varying the pressure, or the volume, of a stream of assist air to said fuel inlet means in accordance with the rate of introduction of said fuel.

2. A combustor according to claim 1, comprising, in further combination:

an outer casing; and wherein said flame tube is disposed in said casing and spaced apart therefrom to form an annular chamber between said casing and said flame tube; and said second air inlet means and said third air inlet means are each in communication with said annular chamber for respectively admitting said second and third streams of air into said flame tube from said annular chamber.

3. A combustor according to claim 2 wherein said variable first air inlet means disposed in said dome member comprises:

at least one air passage means of variable cross-sectional area provided in and extending through said dome member into communication with said first combustion section; and means for varying the cross-sectional area of said air passage means and thus controlling the volume of said first stream of air admitted to said first combustion section.

4. A combustor according to claim 3 wherein said means for varying the cross-sectional area of said air passage means in said dome member includes means for varying said cross-sectional area in accordance with the rate of flow of fuel to said combustor.

5. A combustor according to claim 3 wherein said air passage means in said dome member extends axially therethrough for admitting said first stream of air in an axial direction with respect to said first combustion section and coaxially with respect to said fuel inlet means.

6. A combustor according to claim 3 wherein said air passage means in said dome member extends radially therethrough for admitting said first stream of air in a radial direction with respect to said first combustion section and said fuel inlet means.

7. A combustor according to claim 3 wherein:

an annular wall means is disposed on the downstream side of said dome member, and a first orifice formed in said wall means defines the outlet from said dome member;

said second air inlet means comprises a first plurality of tangential slots extending through the wall of the upstream end portion of said flame tube adjacent said outlet from said dome member;

a second orifice is disposed in said flame tube downstream from said first tangential slots;

said third air inlet means comprises a second plurality of tangential slots extending through the wall of an intermediate portion of said flame tube adjacent and downstream from said second orifice; and a third orifice is disposed in said flame tube adjacent and downstream from said second tangential slots.

8. A combustor according to claim 7 wherein:

the inner wall surface of said flame tube tapers inwardly from the downstream edge of said first tangential slots to the upstream edge of said second orifice to form an inwardly tapered passageway from said slots to said orifice; and an annular radially extending wall member extends into said flame tube adjacent the downstream edge of said second tangential slots, and said third orifice is formed in said wall member.

9. A combustor according to claim 2 wherein:

an annular wall means is disposed on the downstream side of said dome member, and a first orifice formed in said wall means defines the outlet from said dome member;

said second air inlet means comprises a first plurality of tangential slots formed in an upstream first wall section of said flame tube and adjacent the upstream end of said wall section;

a second orifice is formed in said first wall section adjacent the downstream end thereof;

said third air inlet means comprises a second plurality of tangential slots formed in an intermediate second wall section and adjacent the upstream end of said second wall section, with said second wall section being located adjacent and downstream from said first wall section; and a third orifice is formed in said second wall section adjacent and downstream from said tangential slots therein.

10. A combustor according to claim 9 wherein:

said annular wall means comprises a flange comprising the downstream end of said dome member;

said first wall section comprises the upstream end portion of said flame tube, and said first tangential slots formed in said first wall section are formed in the upstream end portion thereof with the downstream wall of said flange forming the upstream walls of said first slots;

the inner wall surface of said first wall section tapers inwardly from the downstream edge of said first tangential slots to the upstream edge of said orifice in said first wall section to form an inwardly tapered passageway from said first slots to said orifice;

said second wall section is disposed with its upstream edge contiguous to the downstream edge of said first wall section, and said second tangential slots formed in said second wall section are formed in the upstream end portion thereof with the downstream edge of said first section forming the upstream walls of said second slots;

and third orifice formed in said second wall section adjoins said second tangential slots formed therein; and an annular radially extending wall member extends into said flame tube adjacent the downstream edge of said second tangential slots, and said third orifice is formed in said wall member.

11. A combustor according to claim 10 wherein a fourth air inlet means is provided in the wall of said flame tube downstream from said third air inlet means for admitting a fourth stream of air comprising quench or dilution air into said flame tube.

12. A combustor, comprising, in combination:

a flame tube;

a dome member disposed at the upstream end of said flame tube;

a fuel inlet means disposed in said dome member for introducing a fuel into an upstream first combustion section of said flame tube;

a variable first air inlet means provided in said dome member for admitting a variable volume of a first stream of air through said dome member and into said first combustion section of said flame tube;

a second air inlet means disposed in the wall of said flame tube for admitting a second stream of air into said first combustion section in a circumferential direction and tangential to the wall thereof;

a third air inlet means disposed in the wall of said flame tube downstream from said second air inlet means for admitting a third stream of air into a second combustion section in a circumferential direction and tangential to the wall thereof, said second combustion section being located in said flame tube downstream from in communication with said first combustion section; and an annular radially extending wall member extending into said flame tube adjacent the downstream edge of said second tangential slots.

13. A combustor according to claim 12 comprising, in further combination:

an outer casing; and wherein said flame tube is disposed in said casing and spaced apart therefrom to form an annular chamber between said casing and said flame tube; and said second air inlet means and said third air inlet means are each in communication with said annular chamber for respectively admitting said second and third streams of air into said flame tube from said annular chamber.

14. A combustor according to claim 13 wherein said variable first air inlet means disposed in said dome member comprises:

at least one air passage means of variable cross-sectional area provided in and extending through said dome member into communication with said first combustion section; and means for varying the cross-sectional area of said air passage means and thus controlling the volume of said first stream of air admitted to said first combustion section.

15. A combustor according to claim 14 wherein:

an annular wall means is disposed on the downstream side of said dome member, and a first orifice formed in said wall means defines the outlet from said dome member;

said second air inlet means comprises a first plurality of tangential slots extending through the wall of the upstream end portion of said flame tube adjacent said outlet from said dome member;

a second orifice is disposed in said flame tube downstream from said first tangential slots;

said third air inlet means comprises a second plurality of tangential slots extending through the wall of an intermediate portion of said flame tube adjacent and downstream from said second orifice; and a third orifice is disposed in said flame tube adjacent and downstream from said second tangential slots.

16. A combustor according to claim 15 wherein:

the inner wall surface of said flame tube tapers inwardly from the downstream edge of said first tangential slots to the upstream edge of said second orifice to form an inwardly tapered passageway from said slots to said orifice; and said third orifice is formed in said radially extending wall member.

17. A method for the combustion of a fuel in a combustion zone having a first upstream combustion region, and a second combustion region located adjacent, downstream from, and in communication with said first combustion region, which method comprises, in combination:

introducing a stream of fuel together with a stream of assist air into the upstream end portion of said first combustion region;

introducing a first stream of air at a controlled but variable rate into said upstream end portion of said first combustion region;

tangentially introducing a second stream of air into said first combustion region in a circumferential direction and forming a combustible mixture of said fuel and said streams of air;

causing at least partial combustion of said combustible mixture and forming hot combustion products;

tangentially introducing a third stream of air into said second combustion region in a circumferential direction;

controlling said variable rate of introduction of said first stream of air in accordance with the rate of introduction of said fuel; and controlling the pressure, or the volume, of said stream of assist air in accordance with the rate of introduction of said fuel.

18. A method according to claim 17 wherein:

said tangentially introduced second stream of air is introduced in one of a clockwise direction and a counter-clockwise direction, looking downstream in said combustion zone; and said tangentially introduced third stream of air is introduced in the other of said clockwise and counter-clockwise directions which is different from the direction of introduction of said second stream of air.

19. A method according to claim 18 wherein:

said fuel is introduced generally axially with respect to said first combustion region; and said first stream of air is introduced around said fuel in a direction generally axial with respect to said first combustion region.

20. A method according to claim 18 wherein:

said fuel is introduced as a hollow cone which diverges from its point of introduction; and said first stream of air intercepts said cone and mixes with said fuel.

21. A method according to claim 18 wherein:

said fuel is introduced generally axially with respect to said first combustion region; and said first stream of air is introduced around said fuel in a direction which is generally perpendicular to the direction of introduction of said fuel.

22. A method for the combustion of a fuel in a combustion zone to produce hot combustion gases having low emissions of $NO_x$, CO, and HC, said combustion zone having a first upstream combustion region, and a second combustion region located adjacent and downstream from said first combustion region, which method comprises:

introducing a stream of fuel together with a stream of assist air into the upstream end portion of said first combustion region;

introducing a first stream of air at a controlled but variable rate into said upstream end portion of said first combustion region around said fuel;

tangentially introducing a second stream of air into said first combustion region in a circumferential direction and forming a combustible mixture of said fuel and said streams of air;

causing at least partial combustion of said combustible mixture so as to form hot combustion products therefrom;

passing hot combustion products and any remaining said mixture from said first combustion region into said second combustion region;

tangentially introducing a third stream of air into said second combustion region in a circumferential direction around said hot combustion products entering said second combustion region;

controlling said variable rate of introduction of said first stream of air in accordance with the rate of introduction of said fuel; and controlling the pressure, or the volume, of said stream of assist airin accordance with the rate of introduction of said fuel.

23. A method according to claim 22 wherein:

said fuel is introduced generally axially with respect to said first combustion region; and the rates of introduction of each of said fuel, said first stream of air, and said second stream of air are such that the flame from combustion of said combustible mixture is seated in said first combustion region.

24. A method according to claim 22 wherein:

said fuel is introduced generally axially with respect to said first combustion region;

the rates of introduction of each of said fuel, said first stream of air, and said second stream of air are such that a core comprising flame and hot combustion products forms along the axis of said first combustion region; and said second stream of air is swirling in a clockwise direction around said core.

25. A method according to claim 24 wherein:

upon a sufficient increase in the rates of introduction of said fuel and said first stream of air, said core is caused to move downstream from said first combustion region and into said second combustion region;

said third stream of air is introduced with a swirl in a counterclockwise direction and neutralizes said clockwise swirl of said second stream of air; and said flame is stabilized in said second combustion region.

26. A method according to claim 22 wherein:

said fuel is introduced generally axially with respect to said first combustion region; and the rates of introduction of said fuel, said first stream of air, and said second stream of air are such that the flame from combustion of said combustible mixture has been caused to move downstream from said first combustion region and into said second combustion region and is there stabilized.

27. A method according to claim 26 wherein upon a sufficient decrease in the rates of introduction of said fuel and said first stream of air, said flame retreats upstream from said second combustion region and into said first combustion region and is there stabilized.

28. A method according to claim 22 wherein said hot combustion products and any remaining said mixture are abruptly expanded essentially immediately after entry into said second combustion region.

29. A method according to claim 22 wherein the pressure of said assist air is maintained within the range of from 2 to 15 psi greater than the inlet air pressure of said other streams of air.

30. A combustor, comprising, in combination:

an outer casing;

a flame tube comprising an upstream first wall section, an intermediate second wall section located adjacent and downstream from said first wall section, and a third wall section located adjacent and downstream from said second wall section, disposed in said casing and spaced apart therefrom to form an annular chamber between said casing and said flame tube;

a dome member disposed at the upstream end of said flame tube;

an annular wall means disposed on the downstream side of said dome member;

a first orifice formed in said wall means and defining the outlet from said dome member;

an air-assisted fuel inlet means disposed in said dome member for introducing a stream of fuel into an upstream first combustion section of said flame tube;

a variable first air inlet means provided in said dome member for admitting a variable volume of a first stream of air through said dome member, around said fuel inlet means, and into said first combustion section of said flame tube;

a second air inlet means comprising a first plurality of tangential slots formed in and extending through the upstream end of said first wall section of said flame tube into communication with said annular chamber for admitting a second stream of air from said annular chamber into said first combustion section in a circumferential direction and tangential to the inner wall thereof, with the downstream wall of said annular wall means forming the upstream walls of said first slots;

a second orifice formed in said first wall section adjacent the downstream end thereof; the inner wall surface of said first wall section tapering inwardly from the downstream edge of said first slots to the upstream edge of said second orifice to form an inwardly tapered passageway from said first slots to said second orifice;

a third air inlet means comprising a second plurality of tangential slots formed in and extending through the upstream end of said second wall section of said flame tube into communication with said annular chamber for admitting a third stream of air from said annular chamber into a second combustion section in a circumferential direction and tangential to the inner wall thereof, said second combustion section being located in said flame tube downstream from and in communication with said first combustion section, and with the downstream edge of said first wall section of said flame tube forming the upstream walls of said second slots;

a third orifice formed in said second wall section adjoining and downstream from said second slots formed therein; and means for varying the pressure, or the volume, of a stream of assist air to said fuel inlet means in accordance with the rate of introduction of said fuel.

31. A combustor according to claim 30 wherein:

the downstream end portion of said second wall section of said flame tube comprises an annular wall member which extends radially into said flame tube and adjoins the downstream edge of said second tangential slots;

said third orifice is formed in said wall member; and said flame tube expands abruptly in cross section immediately downstream from the downstream surface of said wall member.

* * * * *